(12) United States Patent
Lim et al.

(10) Patent No.: US 11,922,700 B2
(45) Date of Patent: Mar. 5, 2024

(54) INTELLIGENT OBJECT SELECTION FROM DRONE FIELD OF VIEW

(71) Applicant: MOTOROLA SOLUTIONS, INC., Chicago, IL (US)

(72) Inventors: Bing Qin Lim, Bayan Lepas (MY); Janet A Manzanares, Broomfield, CO (US); Jeff Talbot, Chicago, IL (US); Maryam Eneim, Boca Raton, FL (US); Todd M Conklin, Saint Charles, IL (US); Jami Perkins, Danville, CA (US); Jon Milan, Redmond, WA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 98 days.

(21) Appl. No.: 17/646,780

(22) Filed: Jan. 3, 2022

(65) Prior Publication Data
US 2023/0215182 A1   Jul. 6, 2023

(51) Int. Cl.
*G06T 7/70* (2017.01)
*B64C 39/02* (2023.01)
(Continued)

(52) U.S. Cl.
CPC ............ *G06V 20/54* (2022.01); *B64C 39/024* (2013.01); *G06F 16/29* (2019.01); *G06T 7/70* (2017.01);
(Continued)

(58) Field of Classification Search
CPC ...... G06V 20/54; G06V 20/17; B64C 39/024; G06F 16/29; G06T 7/70; G06T 2207/10032; G06T 2207/20132; G06T 2207/30232; G06T 2207/30236; B64U 2101/30
USPC ......................................................... 382/103
See application file for complete search history.

(56) References Cited

U.S. PATENT DOCUMENTS 9,967,724 B1 * 5/2018 Gan ........................ G06F 3/167
10,956,980 B1   3/2021 Flick
(Continued)

FOREIGN PATENT DOCUMENTS

KR       102129408 B1   7/2020
WO         9735433 A1   9/1997
(Continued)

OTHER PUBLICATIONS

Peter L. Venetianer and Patrick L. Henson: "Drone Based Automatic Scene Inventory", Motorola Solutions, Inc. 2020, all pages.
(Continued)

*Primary Examiner* — Stephen P Coleman (57) ABSTRACT

A method and apparatus for aiding a police officer in writing a report by creating a depiction of an incident scene is provided herein. During operation a drone will photograph an incident scene from above. Relevant objects will be identified and a depiction of the incident scene will be created by overlaying the relevant photographed real world objects onto a map retrieved from storage. The depiction of the incident scene will be made available to police officers to increase the officers' efficiency in report writing. More particularly, officers will no longer need to re-create the depiction of the incident scene by hand. Instead, the officer will be able to use the depiction of the incident scene.

20 Claims, 4 Drawing Sheets

(51) Int. Cl.
*G06F 16/29* (2019.01)
*G06V 20/17* (2022.01)
*G06V 20/54* (2022.01)
*B64U 101/30* (2023.01)

(52) U.S. Cl.
CPC .......... *G06V 20/17* (2022.01); *B64U 2101/30* (2023.01); *G06T 2207/10032* (2013.01); *G06T 2207/20132* (2013.01); *G06T 2207/30232* (2013.01); *G06T 2207/30236* (2013.01)

(56) References Cited

U.S. PATENT DOCUMENTS

| | | | |
|---|---|---|---|
| 10,970,928 B2 | 4/2021 | Jin et al. | |
| 2007/0188626 A1* | 8/2007 | Squilla | H04N 1/00132 348/222.1 |
| 2014/0118543 A1 | 5/2014 | Kerbs et al. | |
| 2014/0245210 A1 | 8/2014 | Battcher et al. | |
| 2017/0039765 A1 | 2/2017 | Zhou et al. | |
| 2017/0277953 A1 | 9/2017 | Stanley | |
| 2018/0059660 A1 | 3/2018 | Heatzig et al. | |
| 2018/0262897 A1* | 9/2018 | Hennessy | H04M 3/5116 |
| 2019/0189153 A1 | 6/2019 | Gan et al. | |
| 2020/0175861 A1 | 6/2020 | Wansa et al. | |

FOREIGN PATENT DOCUMENTS

| | | | | |
|---|---|---|---|---|
| WO | WO-9735433 A1 * | 9/1997 | | G01C 11/02 |
| WO | 2020171901 A1 | 8/2020 | | |

OTHER PUBLICATIONS

The International Search Report and the Written Opinion, corresponding patent application No. PCT/US2022/053309 filed: Dec. 19, 2022, dated Mar. 29, 2023, all pages.

* cited by examiner

INTELLIGENT OBJECT SELECTION FROM DRONE FIELD OF VIEW

BACKGROUND OF THE INVENTION

Oftentimes police officers spend more than fifty percent of their time completing incident reports. Heavy report writing and paperwork keep police officers away from higher-value tasks such as fighting crime, interacting with citizens, and keeping citizens safe. Improving efficiency in report writing will generally lead to greater officer participation in higher-value tasks. Therefore, a need exists for a method and apparatus for improving the efficiency of police officers report writing and paperwork.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for aiding a police officer in writing a report by creating a depiction of an incident scene is provided herein. During operation a drone will photograph an incident scene from above. Relevant objects will be identified and a depiction of the incident scene will be created by overlaying the photographed real world relevant objects onto a map retrieved from storage. The depiction of the incident scene will be made available to police officers to increase the officers' efficiency in report writing. More particularly, officers will no longer need to re-create the depiction of the incident scene by hand. Instead, the officer will be able to use the depiction of the incident scene.

In one embodiment, the relevant objects at an incident scene that are shown on the depiction of the incident scene are determined by accessing a database that contains a list of relevant objects for a particular incident type. For example, for an incident type identified as a "vehicle accident", objects such as non-emergency vehicles, license plates, road signs, road tire marks, accident debris, skid marks . . . , etc. may be identified as relevant. However, for an incident type identified as "domestic dispute" road signs and license plates may not be identified as relevant. In another example, for an incident type identified as "murder", object such as knife, bullet, gun, blood, rope, body laid down on floor, body with blood etc. may be identified as relevant.

In one embodiment of the present invention, a computer-aided dispatch (CAD) incident identifier (ID) is utilized to determine the relevant objects. An incident identification (sometimes referred to as an incident scene identifier, or a CAD incident identifier) is generated for incidents where an officer is dispatched, and uniquely identifies public-safety events. The CAD ID could be something as simple as a number, or something as complicated as an identification that is a function of populated fields, one of which may comprise an incident type. The CAD incident identifier will be used by the drone to retrieve the incident type information and the list of relevant objects for the particular incident type. The list for relevant objects of the particular incident type can be a predetermined list, or can be a dynamically updated list based on the forensic input at the incident scene. For example, in a murder case, a predetermined list of relevant object will be gun, bullet, knife, blood and/or rope, but it can be dynamically updated with a relevant object of vase if a forensic officer key in forensic input of cause of death is suspected to be hit by a vase where a vase shards is found in the wound of the victim, into a forensic input user interface of a device that linked to the public safety database based on the CAD incident identifier.

Expanding on the above, a drone will take an image of an incident scene, and relevant objects will be automatically identified based on the incident identifier. The photographed real world object images are then cropped from the image of the incident scene and overlaid on a map retrieved from storage. The positions of the relevant objects are maintained on the map as they were at the incident scene. The result comprises a re-creation of the incident scene (i.e., a depiction of the incident scene) that comprises a map having objects identified as relevant to the particular incident overlaid on the map, and excluding those objects that are not relevant. This map is then stored, and provided to the officer so that the officer can use it in any report that the officer needs to create.

It should be noted that in the above description, "incident identifier" refers to a public-safety incident identifier, such as, but not limited to any type of crime, traffic accidents, weather phenomenon, fire, . . . , etc. which can, for example, be determined from a CAD ID. However, in addition to an incident identifier, other criteria may be utilized to determine relevant objects at an incident scene. For example:

Relevant objects may be determined as those objects being interacted with by any police officer on scene: For example, a drone may "watch" the incident scene as public-safety officers arrive. Relevant objects may be determined by witnessing which objects/individuals are under paramedic care, photographed, interviewed, surrounded, searched, measured, . . . etc.

Relevant objects may be determined by those objects/individuals that are within an incident boundary set up by officers. For example, the incident scene may be monitored as public-safety officers arrive. Relevant objects may be determined by witnessing crime-scene tape being deployed. Those objects within the crime-scene tape may be identified as relevant. In another example, incident boundary can be determined by determining the area occupied by evidence stands or evidence number tags that are placed beside evidence at the incident area.

Relevant objects may be determined by those objects/individuals that are selected by an officer. For example, all objects at the incident scene may be presented in a depiction of the incident scene. An officer may be presented with the depiction and allowed to select which objects to include or delete from the depiction.

Relevant objects may be determined as those objects/individuals that are being interacted with those objects that have already been determined as relevant by other prior mentioned criterias. For example, a lamp pole that is knocked down by a vehicle that has been interacted by a police officer (determined as relevant by prior mentioned criterias) is now determined as a relevant object as it is being interacted (knocked down) by the vehicle.

Figure 1:
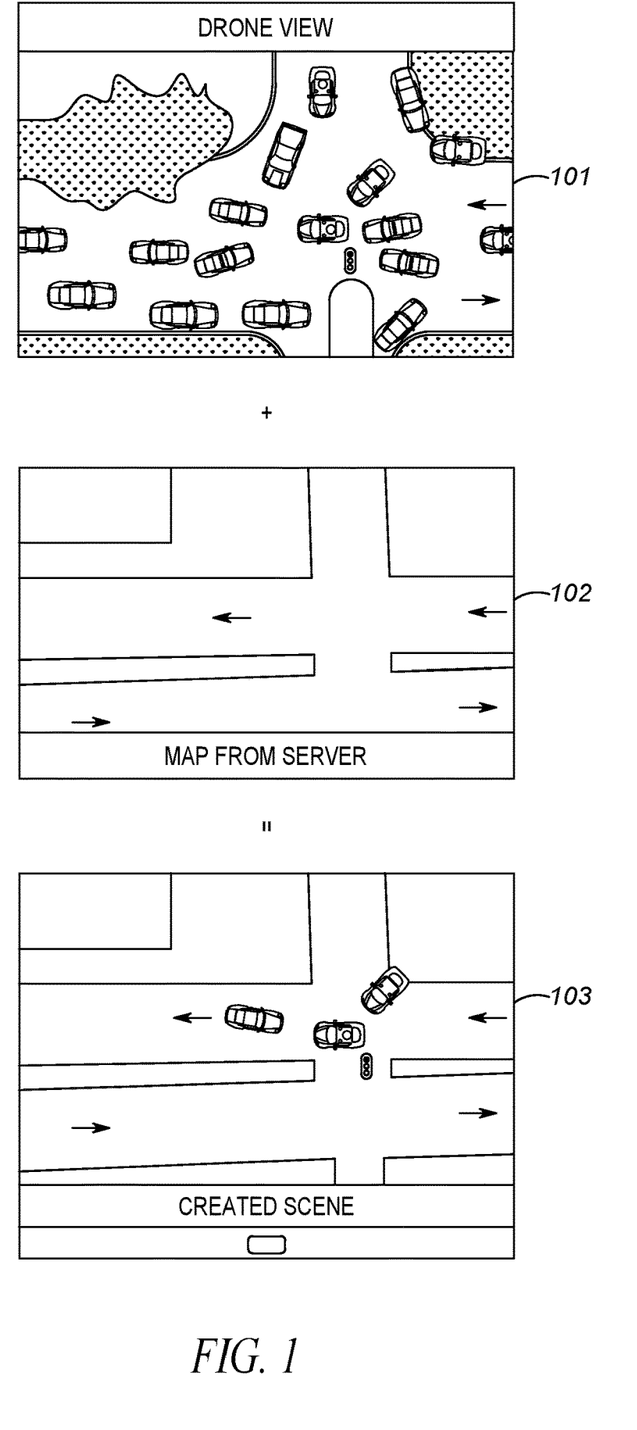
FIG. 1 illustrates overlaying relevant objects upon a map.

The above-described technique for producing a depiction of an incident scene is illustrated in FIG. 1. As shown in FIG. 1, a drone's view 101 of the incident scene comprises many objects such as cars, trees, a stoplight, buildings, . . . , etc. All of these objects may not be relevant to the incident. A map 102 from a server is obtained and the zoom and rotation of the map is made to match that of the drone's view so that they may be overlaid without substantial difference in road locations. For example, a map may be obtained from Google™ maps, and appropriately sized, rotated, and zoomed so that it overlays drone view 101 such that the roads within drone view 101 appropriately align with the roads from the map 102 obtained from Google™.

Relevant objects are then determined as described above. Preferably, the relevant objects are determined by a remote server (remote from the drone), however in alternative embodiments, the processing power to determine the relevant objects may be placed within the drone itself. Regardless of what system entity determines the relevant objects, the relevant photographed real world objects are overlaid on map 102 to produce a rendering or depiction of the incident scene 103 that can be used by an officer for any report.

Figure 2:
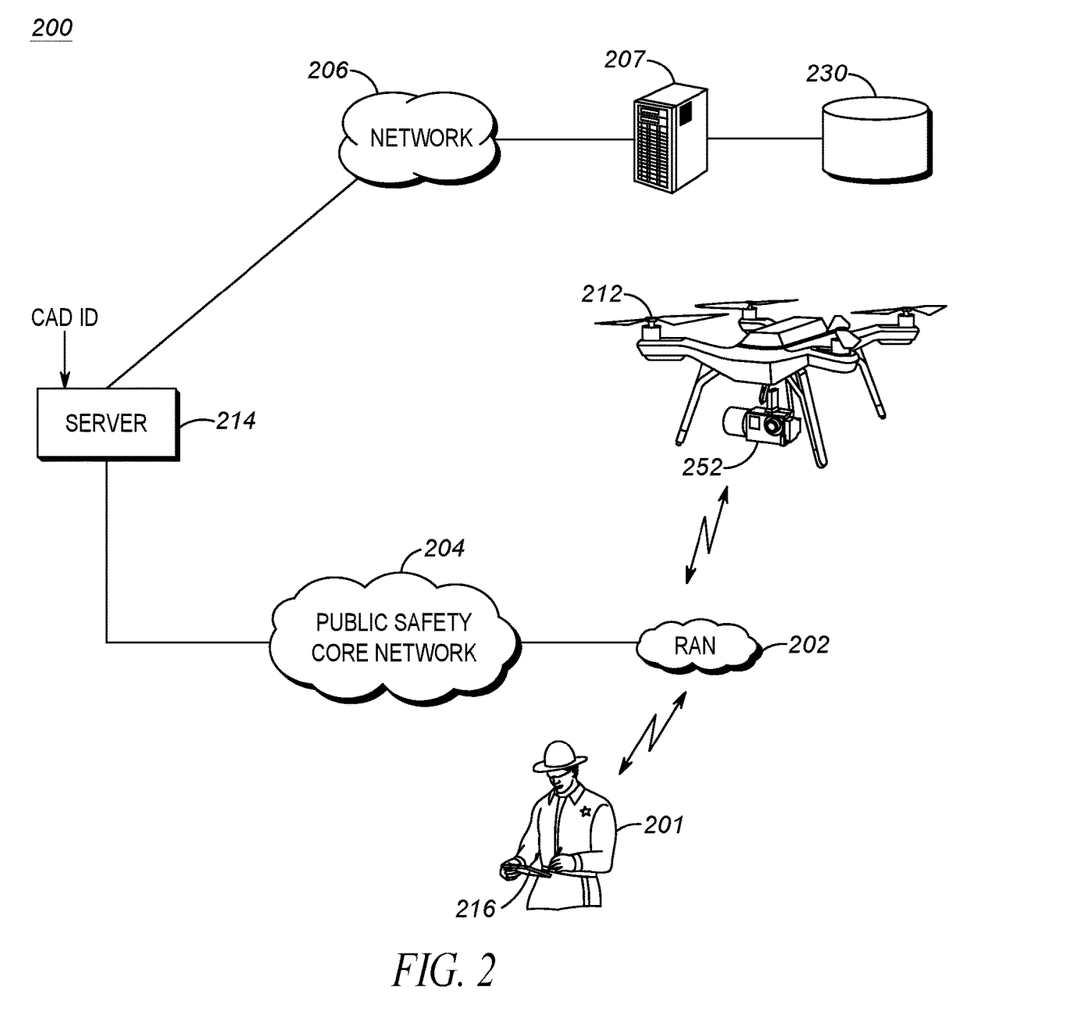
FIG. 2 illustrates an environment for aiding a police officer in report writing.

FIG. 2 is a general operating environment 200 for the present invention. Environment 200 includes one or more radio access networks (RANs) 202, a public-safety core network 204, drone 212, camera 252, and report server 214. In a preferred embodiment of the present invention, report server 214 serves to overlay relevant objects onto a map as described above, and store the resulting image in a database (not shown in FIG. 2) so that an officer may access the resulting image and use the image as a representation of an incident scene when writing a report.

Map server 207 provides requested maps to report server 214. More particularly, map server 207 is preferably a web mapping platform and consumer application such as Google™ maps. Map server 207 provides static map images to server 214 upon server 214 requesting such an image. Such an image may be zoomed, tilted, . . . , etc. in order to match an image from camera 252.

Map database 230 comprises terrain information necessary for map server 207 to appropriately provide a requested map. For example, map database 230 may comprise road names and locations, building names and locations, city boundaries, city names, . . . , etc. It should be noted that although only one server 207 is shown coupled to database 230, there may exist many servers 207 providing mapping services to report server 214, with each mapping server 207 sharing database 230 (or a copy of database 230).

In one embodiment of the present invention, map server 207 is shown as a separate entity from report server 214. Communication between report server 214 and map server 207 takes place through an intervening network such as, but not limited to a wired or wireless network 206. Thus, as shown in FIG. 2, two separate networks exist, namely public-safety core network 204, and public network 206.

Each RAN 202 includes typical RAN elements such as base stations, base station controllers (BSCs), routers, switches, and the like, arranged, connected, and programmed to provide wireless service to user equipment (e.g., tablet computer 216 operated by officer 201) in a manner known to those of skill in the relevant art. In a similar manner, network 206 includes elements such as base stations, base station controllers (BSCs), routers, switches, and the like, arranged, connected, and programmed to provide wireless service and map data to user report server 214 in a manner known to those of skill in the relevant art.

The public-safety core network 204 may include one or more packet-switched networks and/or one or more circuit-switched networks, and in general provides one or more public-safety agencies with any necessary computing and communication needs, transmitting any necessary public-safety-related data and communications.

Drone 212 is equipped with camera 252 and wirelessly communicates to RAN 202. Drone 212 and camera 252 may comprise any suitable drone/camera combination configured to provide overhead images to report server 214 along with location data for the images provided. More specifically, drone 212 comprises a combination of a GPS receiver capable of determining a geographic location. In alternate embodiments of the present invention, drone 212 may also comprise a level sensor, a gyroscope, and a compass. A camera field of view (FOV) is provided to report server 214 comprising a location of camera 252. In an alternate embodiment a pointing direction may be provided as well. For example, a GPS location, a level, and a compass heading may be provided. Based on the geographic location (and alternatively, a level, and compass heading) a FOV of camera 252 can be determined by report server 214. For example, a current location of camera 152 may be determined (e.g., 42 deg 04' 03.482343" lat., 88 deg 03' 10.443453" long. 727 feet above sea level). The current location may be used to determine a FOV and assuming the camera is pointing straight down. Alternatively, a compass bearing matching the camera's pointing direction may be determined (e.g., 270 deg. from North), and a level direction of the camera may be determined from the image (e.g., −85 deg. from level). From the above information, the camera's FOV is determined by determining a geographic area captured by the camera. This information is provided to report server 214 and may then be provided to map server 207 to obtain a map corresponding to the camera FOV.

Finally, report server 214 is preferably part of a public-safety dispatch center, manned by an operator providing incident information (e.g., a CAD ID) to report server 207. In other embodiments of the present invention, report server 214 may lie outside of a dispatch center, receiving incident information through public-safety core network 204. During operation, report server 214 receives an overhead image and a FOV from camera 252. From the image, report server determines relevant objects as described above. Utilizing the FOV provided by camera 252, report server obtains an appropriate map from mapping server 207 and overlays those relevant photographed real world objects onto the map as described above. This image is stored in a database (not shown in FIG. 2) so that officer 201 may access it via, for example, computer 216 in wireless communication with RAN 202. The accessed image can then be used by officer 201 in producing any reports about the incident.

Figure 3:
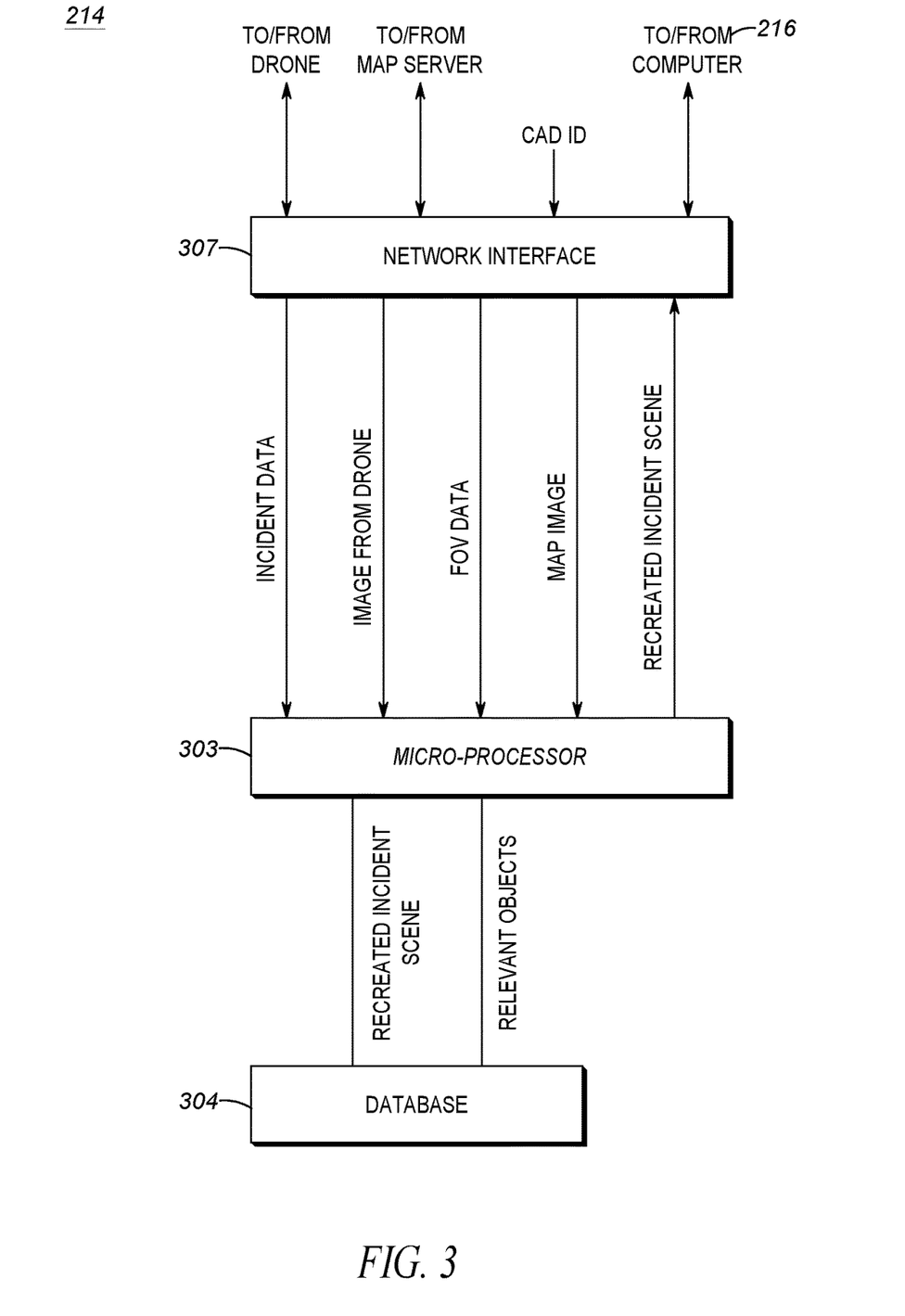
FIG. 3 is a block diagram of a report server.

FIG. 3 is a block diagram of report server 214. As discussed above, report server 214 is preferably housed within a public-safety dispatch center, however, in alternative embodiments of the present invention, report server 214 may be housed in any system entity shown or not shown in FIG. 3. For example, in an alternate embodiment, the components shown in FIG. 3 may be housed in drone 212 or computer 216. As shown, report server 214 comprises network interface 307, microprocessor 303, and storage 304 (non-transitory computer-readable memory). Logic circuitry 303 comprises a digital signal processor (DSP), general purpose microprocessor, a programmable logic device, or application specific integrated circuit (ASIC or CPU) and is configured to serve to create a representation of an incident scene as described above (which may be stored in storage 304 or transmitted elsewhere). The representation of the incident scene may be accomplished by executing software instructions stored in memory 304.

In order to determine relevant objects within any video/image, logic circuitry 303 serves to execute a video analysis engine (VAE) which comprises a software engine (instructions) that analyzes video or images from video. The engine is able to "watch" video and detect pre-selected objects. The VAE may contain any of several object detectors. Each object detector "watches" the video or image for a particular type of object. Object detectors can be mixed and matched depending upon what is trying to be detected. For example, an automobile object detector may be utilized to detect automobiles, while a fire detector may be utilized to detect fires. On detecting a particular object, the VAE may identify the object as important based on, for example, an incident identification. The various VAEs may be stored in memory 304.

Database/memory 304 comprises standard memory (such as RAM, ROM, . . . , etc.) and serves to store video/images, VAEs, and a depiction of an incident scene. In addition, incident IDs and associated relevant objects are stored as shown in Table 1.

Table 1 shows an example of an incident identification and associated relevant objects. The association may be explicit based on predefined rules (prepopulated data), forensic input from forensic officer that associated to that particular incident (based on CAD ID), or the association may be trained via AI learning. Hence, the table may be generated and stored within memory 304.

TABLE 1 association between incident ID and relevant objects

| CAD ID (incident) | Relevant objects |
| --- | --- |
| 0010 (stray animal) | Animals, Humans |
| 0020 (police chase) | Automobiles, license plates |
| 0030 (fire) | buildings, humans, fire |
| . . . | . . . |
| 00xx (vehicle accident) | intersections, road signs, vehicles |

During operation, network interface 307 receives incident data that identifies a type of incident. As discussed above this may comprise a CAD ID received from a network operator (e.g., dispatch center operator). Network interface 307 also receives an image from a drone and FOV data (e.g., latitude and longitude where an image was acquired). The incident data, image, and FOV data are passed to logic circuitry 303. From this information, logic circuitry 303 requests mapping data from mapping server for the area encompassed within the image. This may be accomplished by passing the FOV data to the mapping server 207. Mapping server provides logic circuitry 303 with a relevant map covering the area encompassed by the image. Logic circuitry 303 then re-creates the incident scene by identifying relevant objects in the image, cropping the relevant objects from the image, and overlaying them onto the map in a similar orientation as they appeared in the image. The resulting image is then saved in storage 304 to be later accessed by any officer wishing to acquire a depiction of the incident scene.

With the above in mind, report server 214 comprises an apparatus comprising logic circuitry 303 configured to receive an image of an incident scene taken by a drone, receive field-of-view (FOV) data for the image, utilize the FOV data to request a map from a mapping server, the map encompassing an area shown in the image, receive the map, determine relevant objects from the image, and overlay the relevant objects on the map to create a representation of the incident scene.

In one embodiment of the present invention, logic circuitry 303 is additionally configured to receive a type of incident. The type of incident is preferably received within a computer-aided dispatch (CAD) identification (ID) that identifies the type of incident.

Additionally, the image of the incident scene is taken by the drone from above the incident scene.

Additionally, the FOV data comprises at least a latitude and a longitude where the image was taken.

As discussed above, the relevant objects may be determined from the image by accessing a memory to determine the relevant objects based on a type of incident, as those objects being interacted with by any police officer at the incident scene, or those objects that are within an incident boundary set up by officers (e.g. area deployed with crime scene tape or evidence number tags), or those objects that are selected by an officer (e.g., "clicked on", or touched via a touch screen), or those objects that are interacted with the objects that has been already determined as relevant based on other prior mentioned criteria As shown in FIG. 3, the apparatus further comprises a database storing incident types and their associated relevant objects as shown in Table 1. As mentioned, the list of relevant objects for a particular incident type can be dynamically updated for this particular incident based on forensic input, via a forensic user interface on a device, into the public safety incident database that is linked though CAD ID association.

Figure 4:
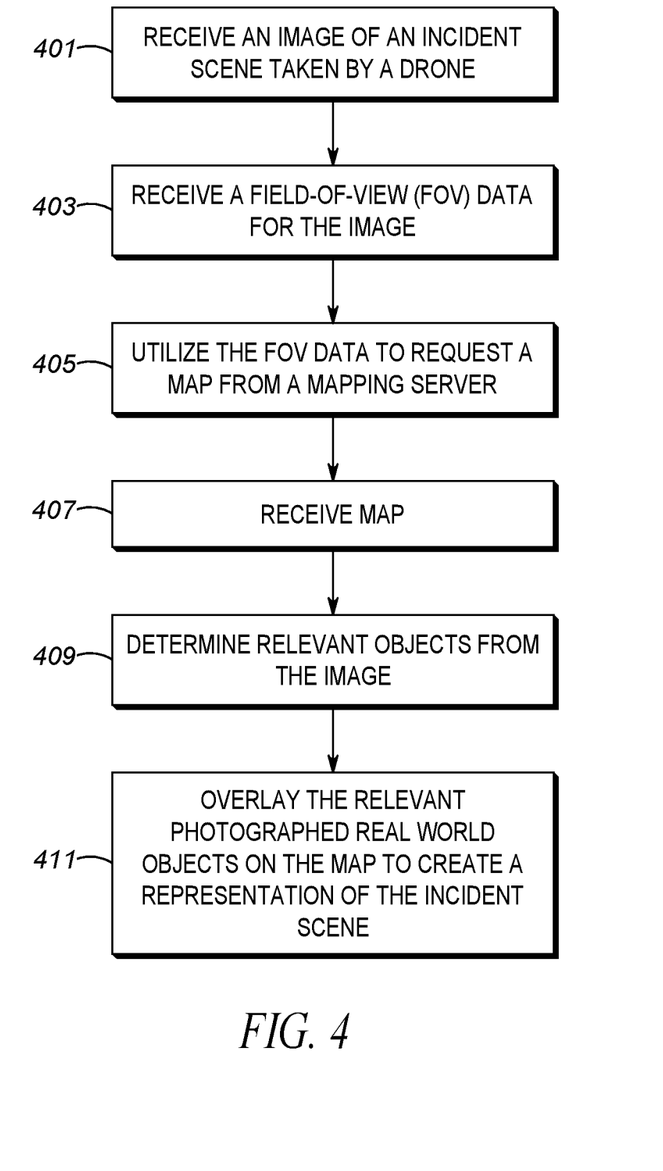
FIG. 4 is a flow chart showing operation of the report server of FIG. 3.

FIG. 4 is a flow chart showing operation of the report server of FIG. 2. The logic flow begins at step 401 where logic circuitry 303 receives an image of an incident scene taken by a drone, and receives a field-of-view (FOV) data for the image (step 403). At step 405, logic circuitry 303 utilizes the FOV data to request a map from a mapping server, the map encompassing an area shown in the image. The map is received at step 407, and at step 409, logic circuitry 303 determines relevant objects from the image. Finally, at step 411, logic circuitry 303 overlays the relevant photographed real world objects on the map to create a representation of the incident scene. It should be noted that in some situations some scaling may be required of the fetched map to align with the overlay. The "Altitude Above Ground" data will aid in scale calculation to replace this manual operation.

As discussed above, an additional step of receiving a type of incident may take place, where the incident type is utilized to determine relevant objects. In a similar manner, an additional step of determining objects that are interacted with may take place, where the interacted-with objects are utilized to determine relevant objects. In a similar manner, an additional step of receiving a user selection of which objects are relevant. Finally, an additional step of determining an incident-scene boundary may take place (e.g. incident scene boundary is determined as area deployed with crime scene tape and evidence number tags), and the relevant objects are determined to be every object within the incident-scene boundary.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   logic circuitry configured to:
   receive a photographed image of an incident scene taken by a drone;
   receive field-of-view (FOV) data for the image;
   utilize the FOV data to request a map from a mapping server, the map encompassing an area shown in the image;
   receive the map;
   determine a set of relevant photographed objects from the photographed image, wherein determining the set of relevant photographed objects comprises one or more of (i) determining the set of relevant photographed objects based on a type of incident at the incident scene, (ii) determining the set of relevant photographed objects to include objects being interacted with by any police officer at the incident scene, (iii) determining the set of relevant photographed objects to include objects that are within an incident boundary set up by police, or (iv) determining the set of relevant photographed objects to include objects that are selected by an officer; and crop and overlay the set of relevant photographed objects on the map to create a representation of the incident scene.

2. The apparatus of claim 1 wherein the logic circuitry is additionally configured to:

determine the type of incident at the incident scene.

3. The apparatus of claim 2 wherein determining the type of incident at the incident scene comprises receiving a computer-aided dispatch (CAD) identification (ID) that identifies the type of incident.

4. The apparatus of claim 1 wherein the photographed image of the incident scene is taken by the drone from above the incident scene.

5. The apparatus of claim 1 wherein the FOV data comprises a latitude and a longitude where the image was taken.

6. The apparatus of claim 1 wherein determining the set of relevant photographed objects comprises determining the set of relevant photographed objects based on the type of incident at the incident scene.

7. The apparatus of claim 1 wherein determining the set of relevant photographed objects comprises determining the set of relevant photographed objects to include objects being interacted with by any police officer at the incident scene.

8. The apparatus of claim 1 wherein determining the set of relevant photographed objects comprises determining the set of relevant photographed objects to include objects that are within an incident boundary set up by police.

9. The apparatus of claim 1 wherein determining the set of relevant photographed objects comprises determining the set of relevant photographed objects to include objects that are selected by an officer.

10. The apparatus of claim 6 further comprising:

a database storing incident types and their associated relevant objects;

wherein the logic circuitry is additionally configured to determine the type of incident at the incident scene; and wherein determining the set of relevant photographed objects based on the type of incident at the incident scene comprises accessing the database to determine the relevant objects stored in association with the determined type of incident.

11. An apparatus comprising:

a database storing incident types and their associated relevant objects; and logic circuitry configured to:

receive a type of incident;

receive a photographed real world image of an incident scene taken by a drone, wherein the image of the incident scene is taken by the drone from above the incident scene;

receive field-of-view (FOV) data for the image comprising a latitude and a longitude where the image was taken;

utilize the FOV data to request a map from a mapping server, the map encompassing an area shown in the image;

receive the map;

determine relevant objects from the image, wherein the relevant objects are determined from the image by accessing the database to determine the relevant objects based on the type of incident;

crop and overlay the relevant objects from the image on the map to create a representation of the incident scene; and store the representation of the incident scene in the database.

12. A method comprising the steps of:

receiving a photographed real world image of an incident scene taken by a drone;

receiving field-of-view (FOV) data for the image;

utilizing the FOV data to request a map from a mapping server, the map encompassing an area shown in the image;

receiving the map;

determining a set of relevant photographed objects from the image, wherein determining the set of relevant photographed objects comprises one or more of (i) determining the set of relevant photographed objects based on a type of incident at the incident scene, (ii) determining the set of relevant photographed objects to include objects being interacted with by a police officer at the incident scene, (iii) determining the set of relevant photographed objects to include objects that are within an incident boundary set up by police, or (iv) determining the set of relevant photographed objects to include objects that are selected by an officer; and cropping and overlaying the set of relevant photographed real world objects on the map to create a representation of the incident scene.

13. The method of claim 12 further comprising:

determining the type of incident at the incident scene.

14. The method of claim 13 wherein determining the type of incident at the incident scene comprises receiving a computer-aided dispatch (CAD) identification (ID) that identifies the type of incident.

15. The method of claim 12 wherein the image of the incident scene is taken by the drone from above the incident scene.

16. The method of claim 12 wherein the FOV data comprises a latitude and a longitude where the image was taken.

17. The method of claim 12 wherein determining the set of relevant photographed objects comprises determining the set of relevant photographed objects based on the type of incident at the incident scene.

18. The method of claim 12 wherein determining the set of relevant photographed objects comprises determining the set of relevant photographed objects to include objects being interacted with by a police officer at the incident scene.

19. The method of claim 12 wherein determining the set of relevant photographed objects comprises determining the set of relevant photographed objects to include objects that are within an incident boundary set up by police.

20. The method of claim 12 wherein determining the set of relevant photographed objects comprises determining the set of relevant photographed objects to include objects that are selected by an officer.

* * * * *